United States Patent
Nakamura

[11] 3,771,853
[45] Nov. 13, 1973

[54] FOUR COMPONENT ZOOM LENS
[75] Inventor: Soichi Nakamura, Kamakura, Japan
[73] Assignee: Nippon Kogaku K.K., Tokyo, Japan
[22] Filed: Dec. 9, 1971
[21] Appl. No.: 206,359

[30] Foreign Application Priority Data
Dec. 15, 1970  Japan .............................. 45/111283

[52] U.S. Cl. ............................ 350/184, 350/214
[51] Int. Cl. .......................................... G02b 15/16
[58] Field of Search ......................... 350/184, 186

[56] References Cited
UNITED STATES PATENTS
| | | | |
|---|---|---|---|
| 3,185,029 | 5/1965 | Peck et al. | 350/184 |
| 2,159,394 | 5/1939 | Mellor et al. | 350/184 |
| 3,143,590 | 8/1964 | Higuchi | 350/184 |

Primary Examiner—John K. Corbin
Attorney—Joseph M. Fitzpatrick et al.

[57] ABSTRACT

A zoom lens of the type in which a first lens group is divergent and all lens groups are movable and which is suitable for use with still cameras. The zoom lens comprises a first lens group of divergence, a second lens group of convergence, a third lens group of divergence and a fourth lens group of convergence, these lens groups being arranged in the named order in the direction from an object. The second to fourth lens groups are displaceable along a common optical axis in the same direction while they are maintained in predetermined conditions. At the same time, the first lens group is displaceable in the opposite direction so as to contribute to the magnification variance and maintain a predetermined focal point.

9 Claims, 34 Drawing Figures

FOUR COMPONENT ZOOM LENS

BACKGROUND OF THE INVENTION

1. Field of the Invention

This invention relates to a zoom lens in which a first lens group is divergent and all lens groups are movable.

2. Description of the Prior Art

As is obvious from a series of inverted-telephoto type wide-angle lenses, a lens system having a divergent lens group as a first lens group is convenient for use in a lens covering a wide angle of view inasmuch as peripheral beams of light can be satisfactorily covered without increasing the diameter of the foremost lens. Such lens system, however, has rarely been adopted for use in zoom lenses because of the difficulties encountered in correcting the aberrations caused by the divergent lens group as the first lens group. The simplest type of the zoom lenses whose first lens group is a divergent lens group would comprise two lens groups, divergent and convergent. Such zoom lenses will have disadvantages that the divergent group forming the first lens group presupposes a large aperture ratio of a second lens group which is a convergent lens group, that the sine condition is extremely variable from negative to positive at the opposite ends of the focal length to thereby seriously aggravate the coma at those opposite ends, and that the distortional aberrations at the opposite ends are greatly reversible from negative to positive. These disadvantages would seriously reduce the performance of the zoom lens, and thus the described type of zoom lens may be said to be very much inferior in performance to lenses of fixed focal length. This is the reason why there is practically no zoom lens which has realized the above-described construction. Also, it has been regarded as theoretically impossible to realize a zoom lens for still cameras of high performances including a wide angle of view, by using the conventional magnification varying system.

SUMMARY OF THE PRESENT INVENTION

The present invention intends to provide an optical system for zoom lenses which has not only solved the foregoing various disadvantages but also can cover a very wide angle of view such as 74° for a minimum focal distance.

The present invention comprises four lens groups sequentially arranged in the direction from an object, namely, a first lens group of divergence, a second lens group of convergence, a third lens group of divergence and a fourth lens group of convergence. The last three lens groups, i.e., the second lens group of convergence, the third lens group of divergence and the fourth lens group of convergence are displaced along a common optical axis in the same direction while maintained in predetermined conditions which will be described hereinafter, and at the same time the first lens group of divergence is displaced in the direction opposite to the direction of movement of the said second to fourth lens groups so as to contribute to the magnification variance and maintain a predetermined focal point.

The invention will become fully apparent from the following detailed description thereof taken in conjunction with the accompanying drawings.

BRIEF DESCRIPTION OF THE DRAWINGS

FIGS. 9(a) to 11(c) are graphs similar to FIGS. 6(a) to 8(c), respectively, but relating to the second embodiment; and FIGS. 12(a) to 14(c) are graphs similar to FIGS. 6(a) to 8(c), respectively, but relating to the third embodiment.

DESCRIPTION OF THE PREFERRED EMBODIMENTS

The present invention will now be considered with respect to the construction and arrangement of various elements in the Gaussian range and their process of displacement.

Figure 1:
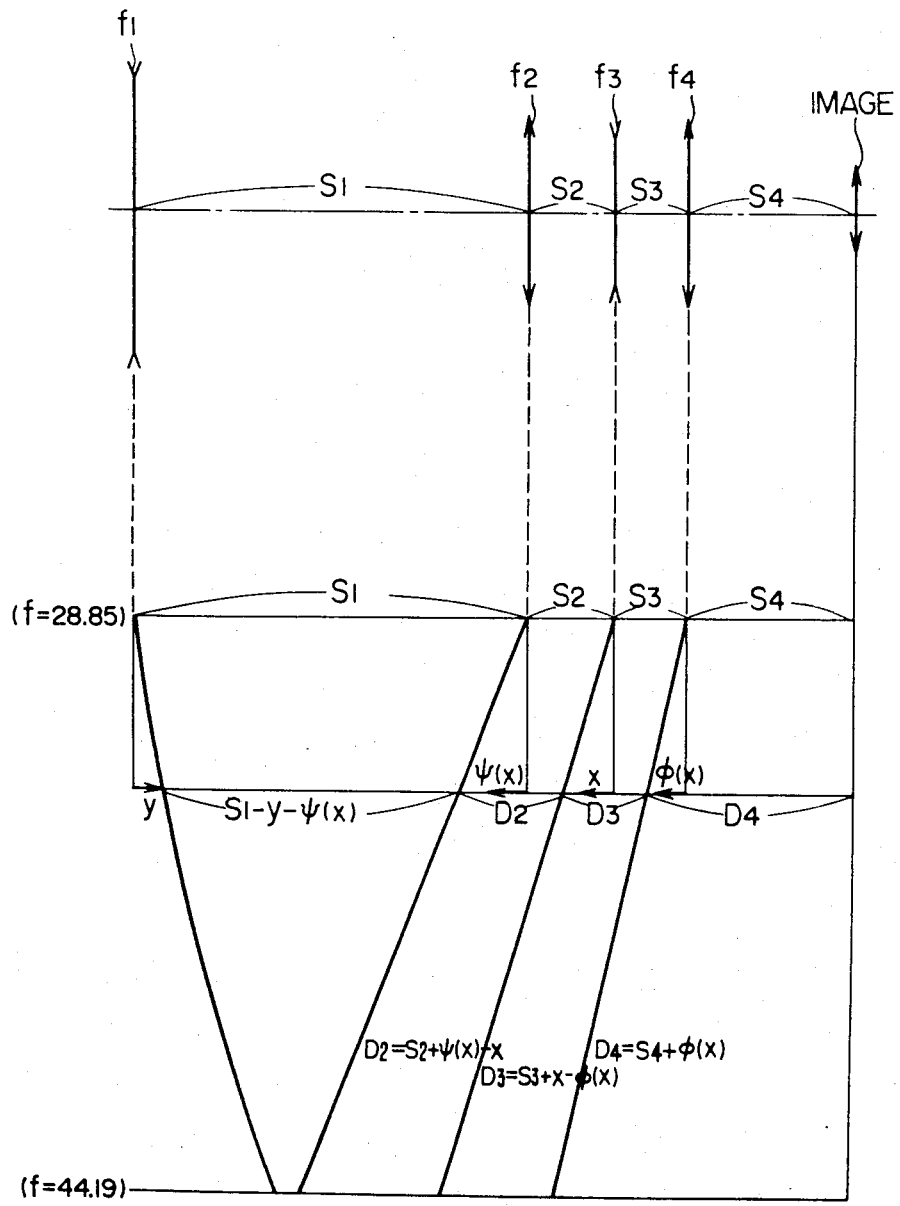
FIG. 1 diagrammatically illustrates the basic construction of the present invention and the process of lens group displacement.

In FIG. 1, it is assumed that a first lens group of divergence, a second lens group of convergence, a third lens group of divergence and a fourth lens group of convergence have focal lengths $f_1$, $f_2$, $f_3$ and $f_4$ respectively, that the inter-principal-plane spacings between the first and second lens groups, between the second and third lens groups, and between the third and fourth lens groups are $S_1$, $S_2$ and $S_3$ respectively, and that the spacing between the principal plane of the fourth lens group and the image plan is $S_4$. The various elements are determined so as to satisfy the following various conditions.

$$f_1 < 0, f_2 > 0, f_3 < 0, f_4 > 0 \tag{1}$$

$$S_4 > f_4 \tag{2}$$

$$S_3 + |f_3| < f_4 S_4/S_4 - f_4 \tag{3}$$

$$|f_3| > S_3 > 0 \tag{4}$$

$$f_4 - |f_3| - S_3 \geq 0 \tag{5}$$

$$f_2 - S_2 < \frac{|f_3||f_4S_4 - S_3(S_4-f_4)|}{f_4S_4 - (S_3+|f_3|)(S_4-f_4)} \quad (6)$$

$$S_2 > 0 \quad (7)$$

$$2|f_3| > f_2 > |f_3| \quad (8)$$

$$|f_1| + S_1 = f_2[S_2\{f_4S_4 - (S_3+|f_3|)(S_4-f_4)\} \\ + |f_3|\{f_4S_4 - S_3(S_4-f_4)\}]/ \\ [(S_2 - f_2)\{f_4S_4 - (S_3+|f_3|)(S_4-f_4)\} \\ + |f_3|\{f_4S_4 - S_3(S_4-f_4)\}] \quad (9)$$

Then, the positions of the principal planes of the respective lens groups for a minimum focal distance are determined in accordance with the aforesaid inter-principal-plane spacings between the various lens groups. It is further assumed that the amounts of displacement of the second, third and fourth lens groups are $\psi(x)$, $x$, and $\phi(x)$, respectively. Then, these three lens groups are displaced toward an object while satisfying the following condition:

$$\psi(x) \geq x > \phi(x) \quad (10),$$

where $\psi(x)$ and $\phi(x)$ are functions which increase with any variation of $x$. In contrast, let the amount of displacement of the first lens group be $y$, which is determined so as to satisfy the following condition:

$$y = S_1 + |f_1| - \psi(x) - P \quad (11),$$

where $$P = f_2[D_2\{f_4D_4 - (D_3+|f_3|)(D_4-f_4)\} \\ + |f_3|\{f_4D_4 - D_3(D_4-f_4)\}]/[(D_2-f_2) \\ \times \{f_4D_4 - (D_3+|f_3|)(D_4-f_4)\} \\ + |f_3|\{f_4D_4 - D_3(D_4-f_4)\}]$$

$$D_2 = S_2 + \psi(x) - x$$
$$D_3 = S_3 + x - \phi(x)$$
$$D_4 = S_4 + \phi(x)$$

Also, let the combined focal length of the allower lens system be F, which is determined so as to satisfy the following relation:

$$F = -\left|\frac{f_1}{f_2f_3f_4}\right|[(f_2-|f_3|-D_2)D_4f_4 \\ + (D_4-f_4)\{D_3|f_3| + (D_2-f_2)(D_3+|f_3|)\}] \quad (12)$$

Figure 2A:
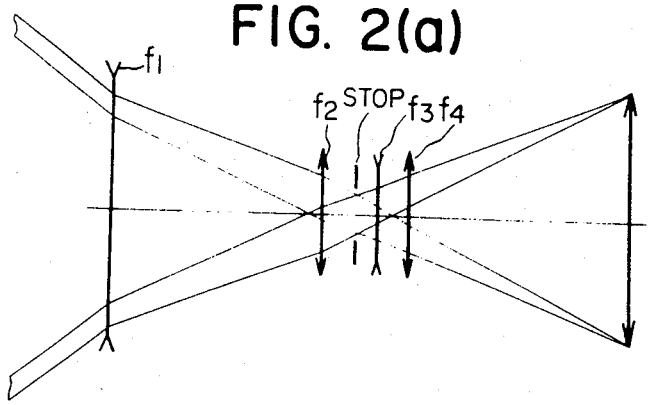
FIGS. 2(a), 2(b) and 2(c) illustrate the basic optical path in the construction of FIG. 1, showing various lens groups as displaced to their respective predetermined positions.
Figure 2B:
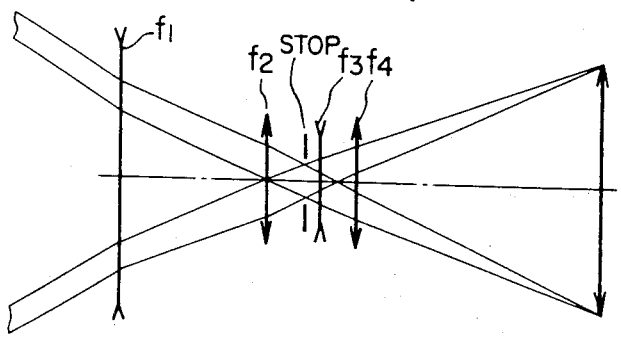
Figure 2C:
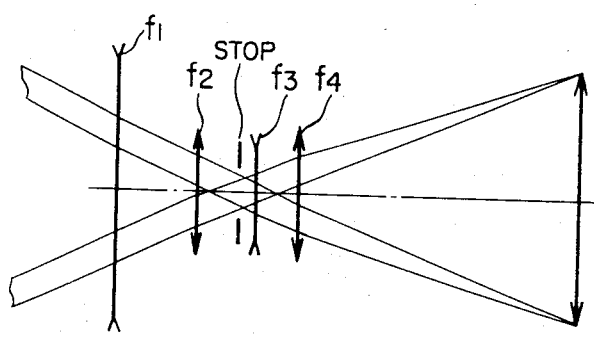

FIGS. 2a, 2b and 2c show the optical path in an example of the optical system according to the present invention. In these figures $f_1$, $f_2$, $f_3$ and $f_4$ represent focal lengths of the first lens group of divergence, the second lens group of convergence and the third lens group of divergence, and the fourth lens group of convergence respectively. FIGS. 2(a), 2(b) and 2(c) show the positions of the lens groups for minimum, medium and maximum focal lengths, respectively.

Description will now be made of the formulae determining elements at the minimum focal length side and of the formulae representing the process of lens group displacement.

Formula (1) expresses the basic construction of the zoom lens embodying the present invention.

Formula (2) is the condition required at least to provide a sufficient back focal distance of such zoom lens at the minimum focal length side. In view of the application of the present invention to single lens reflex cameras, the back focal distance must be sufficiently long. In accordance with formula (2), the zoom lens of the present invention at its minimum focal length side assumes a power arrangement similar to that of the inverted telephoto wide-angle lens, see FIG. 2(a). Therefore, the value of $S_4$ must be greater than the sum of the minimum back focal distance of the optical system desired and the spacing from the principal point of the fourth lens group to the last vertex of the same lens group.

Formula (3) is the condition required for the second to fourth lens groups to assume a triplet type power arrangement for stable aberrations. This condition is the result of the fact that the absolute values of the object point and image point relative to the third lens group are greater than $f_3$.

Formula (4) represents the condition under which the coma can more readily be corrected if the value of $S_3$ is as small as possible at the minimum focal length side which provides an inverted-telephoto type system. More specifically, if the value of $S_3$ is within that range, the coma at the minimum focal length side can be well corrected whereby the balance of such coma with respect to the varying coma at the longer focal length side can be well maintained.

Formula (6) means the condition that the distance between the principal plane of the second lens group and a conjugate relative to the image point with respect to composite lens groups of fourth, third and second lens groups be longer than the focal length $f_2$ of the second lens group in order to increase the power of the first lens group and to determine the shortest possible spacings between the first lens group and the second, third, and fourth lens groups as well as to increase the strokes of the first and second lens groups to thereby provide a greater zoom ratio. If this condition is satisfied, a greater zoom ratio may be provided by a compact construction.

Furthermore, formula (6) combined with formula (5) gives the condition necessary and sufficient to provide a positive combined focal length of the second to fourth lens groups. This combination is intended to avoid the inability of the zoom lens system to form a real image when the composite lens system provided by the second to fourth lens groups becomes a divergent system as a result of the divergence of the first lens group.

Formula (7) represents the condition required to avoid a complicated construction in which the principal planes of the second and third lens groups protrude beyond the lens groups due to the positive inter-principal-plane spacing between the second and the third lens group. Desirably, the second inter-principal-plane spacing $S_2$ should be greater than the sum of the spacing between the principal point of the second lens group and the vertex of the rearmost surface of the second lens group and the spacing between the principal point of the third lens group and the vertex of the foremost surface of the third lens group.

Formula (8) is the condition for making the zoom lens compact in construction. According to the conditions of formulae (1) to (6), the combination of the focal length $f_2$ of the second lens group and the second inter-principal-plane spacing $S_2$ may be of any desired value. However, if the values of $f_2$ and $S_2$ satisfying the formula (6) are too large, it would enlarge the overall lens system and make it unsuitable for practical use. This can be avoided by satisfying the condition of formula (8).

Formula (9) is directed to determine the relation $|f_1| + S_1$ between the focal length $f_1$ of the first lens group and the first inter-principal-plane spacing $S_1$ in accordance with the various elements determined by formula (1) to (8), i.e., the fourth inter-principal-plane spacing $S_4$, the third one $S_3$, the second one $S_2$, the focal length $f_4$ of the fourth lens group, the focal length $f_3$ of the third lens group, and the focal length $f_2$ of the second lens group. Since the value of $|f_1| + S_1$ is a constant determined by $S_4$, $S_3$, $S_2$, $f_4$, $f_3$ and $f_2$, a smaller value of $|f_1|$ will increase the value of $S_1$ and a greater value of $S_1$ will increase the spacing between the first and second lens groups, resulting in an increased stroke of each lens group and, accordingly, an increased rate of magnification variance.

Formula (10) sets forth the condition for determining the amounts of displacement of the second to fourth lens groups, and this is the basic condition for the zoom lens system of the present invention. If the amount of displacement $\psi(x)$ of the second lens group is smaller than $x$ which is the amount of displacement of the third lens group, then there will be a great variation in the distortional aberrations at the opposite focal points in the zoom range, which is the problem of first importance in a wide angle lens system. For this reason, this formula specifies the condition that $\psi(x) \geq x$. Also, if the amount of displacement $\phi(x)$ of the fourth lens group is equal to or greater than the amount of displacement $x$ of the third lens group, there will arise disadvantages similar to those which have been noted above with respect to the well-known zoom lens system, simply comprising two divergent and convergent lens groups. That is, the balance of the sine conditions at the opposite focal points of the zoom range will be lost, thereby rendering the comas at such opposite focal points difficult to correct. This is the reason why the condition $x > \phi(x)$ has been given.

Formula (11) relates to the amount of displacement of the first lens group. If the power arrangement of the Gaussian range at the minimum focal length side is determined so as to satisfy the conditions of formulae (1) to (9) and the amounts of displacement of the second to fourth lens groups are determined so as to satisfy the condition of formula (10), then the amount of the displacement of the first lens group required to provide a zoom lens will primarily be determined by the formula (11).

The combined focal length of the overall lens system is given by formula (12).

Thus, in a zoom lens covering a wide angle of view, the power arrangement first plays a very important role and then a greater thickness of each lens group is useful to provide various changes of lens shape.

A zoom lens system which satisfied all of these conditions leads to the provision of a zoom lens whose lens system is compact but can cover a very wide angle of view and in which each divergent lens group having finely corrected distortional and other aberrations also serves as the preceding image forming system. Such zoom lens is expected to find its novel use for still cameras and will develop new camera techniques.

Some embodiments of the present invention will be exemplified hereunder. In all the embodiments which will appear herein, $\psi(x)$ and $\phi(x)$ are given as the linear functions of $x$ to simplify the manufacture.

Embodiment I

Figure 3:
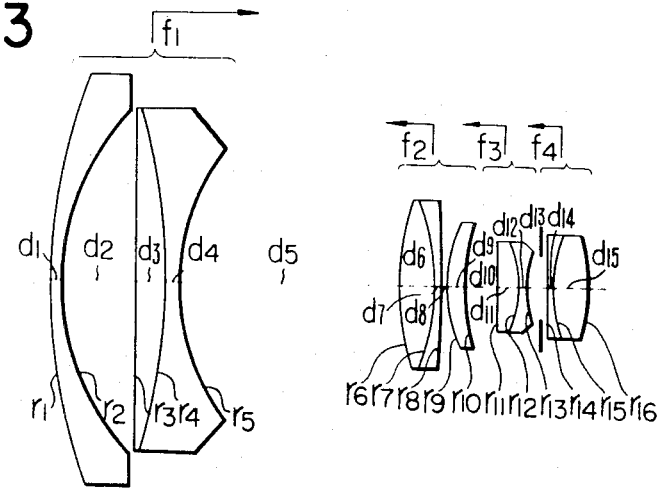
FIG. 3 is a longitudinal sectional view of a first embodiment of the present invention.

This embodiment satisfies the following relations:
$\psi(x) = 1.0287x$
$\phi(x) = 0.8335x$ A stop is interposed between the third and the fourth lens group. The fourth lens group is a doublet which only comprises two concave and convex lenses cemented together, as shown in FIG. 3. For the aperture ratio F/4.5 and the focal length $f=28.85 - 44.19$mm, the various elements of the 35mm still camera zoom lens are selected as follows:

| | | | | |
|---|---|---|---|---|
| $f_1=-50.127$ | $r_1=+74.514$ | $d_1=2.0$ | $n_1=1.54739$ | $\nu_1=53.6$ |
| | $r_2=+35.58$ | $d_2=10.5$ | | |
| | $r_3=-744.562$ | $d_3=4.25$ | $n_2=1.84110$ | $\nu_2=43.3$ |
| | $r_4=-73.091$ | $d_4=1.3$ | $n_3=1.44628$ | $\nu_3=67.2$ |
| | $r_5=+29.225$ | $d_5=30.8806-7.7366$ | | |
| $f_2=24.689$ | $r_6=+37.907$ | $d_6=4.45$ | $n_4=1.6393$ | $\nu_4=45.0$ |
| | $r_7=-28.141$ | $d_7=1.1$ | $n_5=1.744$ | $\nu_5=44.9$ |
| | $r_8=-98.768$ | $d_8=0.1$ | | |
| | $r_9=+19.309$ | $d_9=3.3$ | $n_6=1.57501$ | $\nu_6=41.3$ |
| | $r_{10}=+60.223$ | $d_{10}=3.4106-3.7607$ | | |
| $f_3=-18.637$ | $r_{11}=-118.839$ | $d_{11}=3.7$ | $n_7=1.69895$ | $\nu_7=30.0$ |
| | $r_{12}=-21.666$ | $d_{12}=1.0$ | $n_8=1.80518$ | $\nu_8=25.5$ |
| | $r_{13}=+19.163$ | $d_{13}=2.1584-4.1897$ | | |
| $f_4=26.234$ | $r_{14}=+439.074$ | $d_{14}=0.9$ | $n_9=1.72825$ | $\nu_9=28.3$ |
| | $r_{15}=+20.948$ | $d_{15}=5.1$ | $n_{10}=1.83330$ | $\nu_{10}=36.8$ |
| | $r_{16}=-25.982$ | | | |

Back focus (Bf) = 38.299 − 48.467

In the table above and the tables appearing later, $r$ represents the radius of curvature of each lens, $d$ represents the center thickness and air gap of the lens, $n$ represents the refractive index of the lens glass for $d$-ray, and $\nu$ represents the Abbe number of the lens glass.

Figures 6A, 6B, 6C:
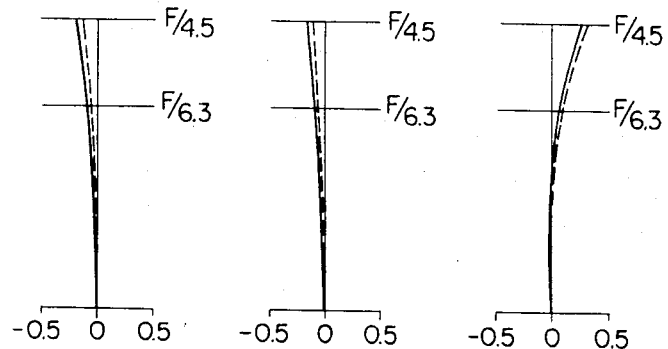
FIGS. 6(a), 6(b) and 6(c) illustrate the curves representing the spherical aberrations and sine conditions in the first embodiment.
Figures 7A, 7B, 7C:
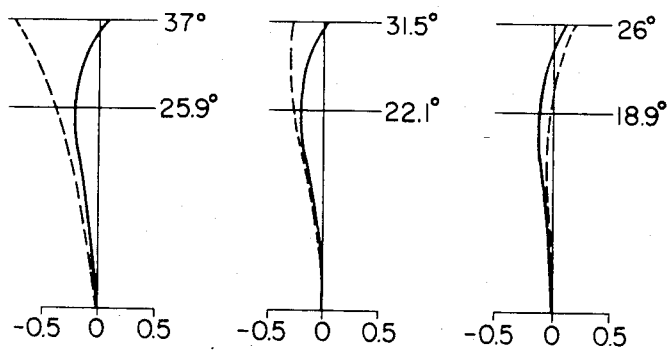
FIGS. 7(a), 7(b) and 7(c) illustrate the curves representing the astigmatisms in the first embodiment.
Figures 8A, 8B, 8C:
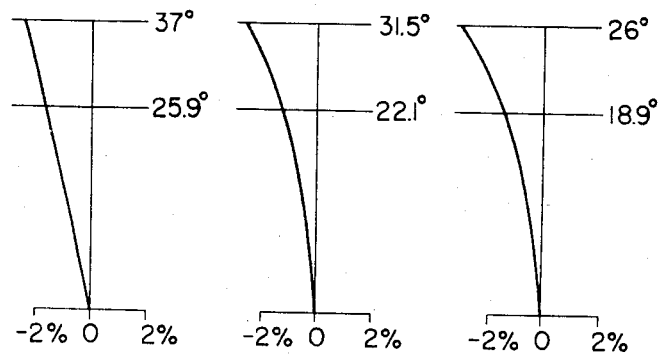
FIGS. 8(a), 8(b) and 8(c) illustrate the curves representing the distortional aberrations in the first embodiment.

The spherical aberration and sine condition in this embodiment are illustrated in FIGS. 6(a), 6(b) and 6(c), and the astigmatism and the distortional aberration are illustrated in FIGS. 7(a), 7(b), 7(c) and FIGS.

8(a), (8b) and 8(c), respectively. In each of these figures, (a), (b) and (c) show the aberrations at the minimum, medium and maximum focal points, respectively. As will be seen, various aberrations have been well corrected and especially correction of distortional aberrations is as good as in the lenses of fixed focal length.

Embodiment II

Again the same relations as those for the previous embodiment are employed:

$\psi(x) = 1.0287x$
$\phi(x) = 0.8335x$

Figure 4:
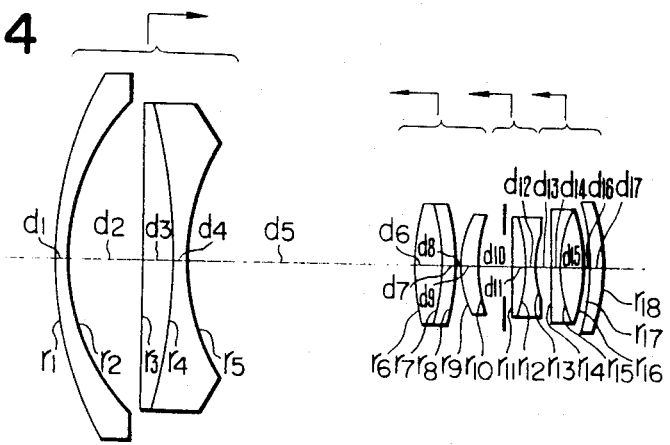
FIGS. 4 and 5 are views similar to FIG. 3, but showing a second and a third embodiment of the present invention.

As shown in FIG. 4, however, a stop is interposed between the second and the third lens group and the fourth lens group comprises a doublet similar to that of the fourth lens group in Embodiment I and an additional convex meniscus lens attached thereto, to decrease the distortional aberration. For the aperture ratio F/4.5 and the focal length $f = 28.85 - 44.19$mm, the various elements of the 35 mm still camera zoom lens are selected as follows:

| | | | | |
|---|---|---|---|---|
| $f_1 = -50.127$ | $r_1 = +47.014$ | $d_1 = 2.0$ | $n_1 = 1.57501$ | $\nu 1 = 41.3$ |
| | $r_2 = +28.131$ | $d_2 = 10.5$ | | |
| | $r_3 = -744.562$ | $d_3 = 4.2$ | $n_2 = 1.806$ | $\nu 2 = 40.6$ |
| | $r_4 = -73.091$ | $d_4 = 1.3$ | $n_3 = 1.44628$ | $\nu 3 = 67.2$ |
| | $r_5 = +29.967$ | $d_5 = 30.9389 - 7.7949$ | | |
| $f_2 = 24.689$ | $r_6 = +37.907$ | $d_6 = 4.5$ | $n_4 = 1.60562$ | $\nu 4 = 43.9$ |
| | $r_7 = -30.741$ | $d_7 = 1.1$ | $n_5 = 1.744$ | $\nu 5 = 44.9$ |
| | $r_8 = -79.559$ | $d_8 = 0.1$ | | |
| | $r_9 = +19.509$ | $d_9 = 3.0$ | $n_6 = 1.56883$ | $\nu 6 = 56.0$ |
| | $r_{10} = +63.793$ | $d_{10} = 4.7410 - 5.0912$ | | |
| $f_3 = -18.637$ | $r_{11} = -106.506$ | $d_{11} = 1.7$ | $n_7 = 1.69895$ | $\nu 7 = 30.0$ |
| | $r_{12} = -19.666$ | $d_{12} = 1.0$ | $n_8 = 1.79504$ | $\nu 8 = 28.4$ |
| | $r_{13} = +19.095$ | $d_{13} = 1.8433 - 3.8746$ | | |
| $f_4 = 26.234$ | $r_{14} = +1439.074$ | $d_{14} = 0.9$ | $n_9 = 1.72825$ | $\nu 9 = 28.3$ |
| | $r_{15} = +20.015$ | $d_{15} = 2.6$ | $n_{10} = 1.8333$ | $\nu 10 = 36.8$ |
| | $r_{16} = -51.269$ | $d_{16} = 1.0$ | | |
| | $r_{17} = -55.0$ | $d_{17} = 2.3$ | $n_{11} = 1.76684$ | $\nu 11 = 46.6$ |
| | $r_{18} = -24.699$ | | | |

Back focus (Bf) = 37.728 − 47.897

Figures 9A, 9B, 9C:
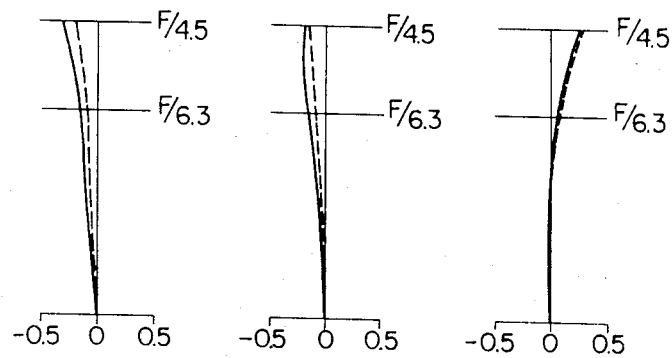
Figures 10A, 10B, 10C:
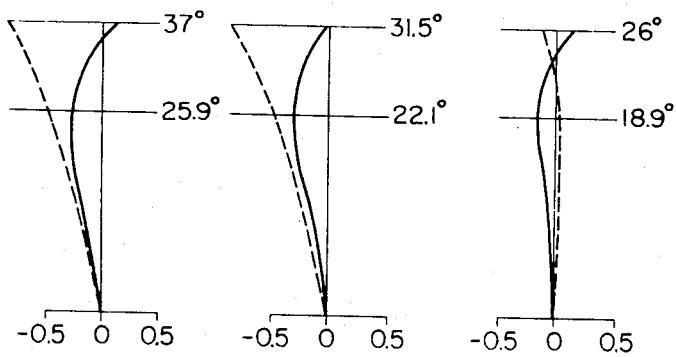
Figures 11A, 11B, 11C:
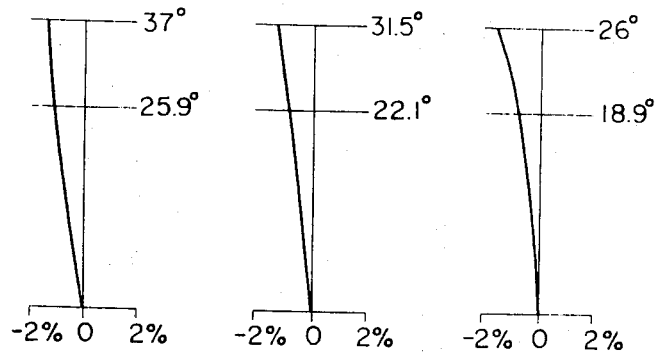

The spherical aberration and sine condition in this embodiment are shown in FIGS. 9(a), 9(b) and 9(c) and the astigmatism and distortional aberration are shown in FIGS. 10(a), 10(b), 10(c) and 11(a), 11(b), and 11(c), respectively. In these Figures, (a), (b) and (c) show the aberrations at the minimum, medium and maximum focal points, respectively. It is seen that the various aberrations have been very well corrected and especially the correction of distortional aberrations is again as good as in the lenses of fixed focal length.

Embodiment III

In this embodiment, the following relations are satisfied:

$\psi(x) = x$
$\phi(x) = 0.7836x$

Figure 5:
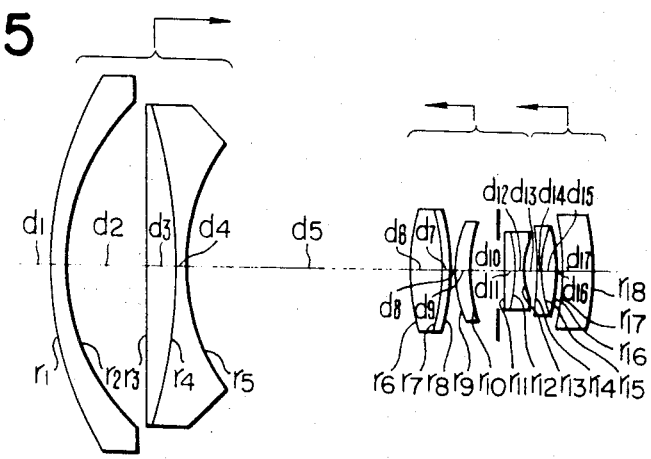

The present embodiment attains the extreme position given by formula (6). By satisfying the relation that $\psi(x) = x$, the cams for causing displacement of the lens group are simplified and the entire mechanism is also simplified. FIG. 5 shows the zoom lens according to such embodiment, and the elements of the 35mm still camera zoom lens are selected as follows for the aperture ratio F/4.5 and the focal length $f = 28.85 - 44.19$mm:

| | | | | |
|---|---|---|---|---|
| $f_1 = -50.127$ | $r_1 = +52.201$ | $d_1 = 2.0$ | $n_1 = 1.52$ | $\nu 1 = 70.1$ |
| | $r_2 = +28.743$ | $d_2 = 11.5$ | | |
| | $r_3 = -744.562$ | $d_3 = 4.2$ | $n_2 = 1.80411$ | $\nu 2 = 46.4$ |
| | $r_4 = -70.591$ | $d_4 = 1.3$ | $n_3 = 1.44628$ | $\nu 3 = 67.2$ |
| | $r_5 = +29.871$ | $d_5 = 30.3905 - 5.8365$ | | |
| $f_2 = 24.689$ | $r_6 = +39.507$ | $d_6 = 4.5$ | $n_4 = 1.61117$ | $\nu 4 = 55.8$ |
| | $r_7 = -32.141$ | $d_7 = 1.1$ | $n_5 = 1.8411$ | $\nu 5 = 43.3$ |
| | $r_8 = -65.335$ | $d_8 = 0.1$ | | |
| | $r_9 = +18.809$ | $d_9 = 3.0$ | $n_6 = 1.54072$ | $\nu 6 = 47.2$ |
| | $r_{10} = +60.333$ | $d_{10} = 4.8$ | | |
| $f_3 = -18.637$ | $r_{11} = -117.506$ | $d_{11} = 1.7$ | $n_7 = 1.69680$ | $\nu 7 = 55.6$ |
| | $r_{12} = -19.070$ | $d_{12} = 1.0$ | $n_8 = 1.80454$ | $\nu 8 = 39.5$ |
| | $r_{13} = +19.373$ | $d_{13} = 1.0864 - 4.1597$ | | |
| $f_4 = 26.234$ | $r_{14} = +889.704$ | $d_{14} = 0.7$ | $n_9 = 1.72825$ | $\nu 9 = 28.3$ |
| | $r_{15} = +22.348$ | $d_{15} = 2.4$ | $n_{10} = 1.84110$ | $\nu 10 = 43.3$ |
| | $r_{16} = -53.729$ | $d_{16} = 0.5$ | | |
| | $r_{17} = -55.0$ | $d_{17} = 4.8$ | $n_{11} = 1.76684$ | $\nu 11 = 46.6$ |
| | $r_{18} = -24.222$ | | | |

Back focus (Bf) = 37.768 − 48.895

Figures 12A, 12B, 12C:
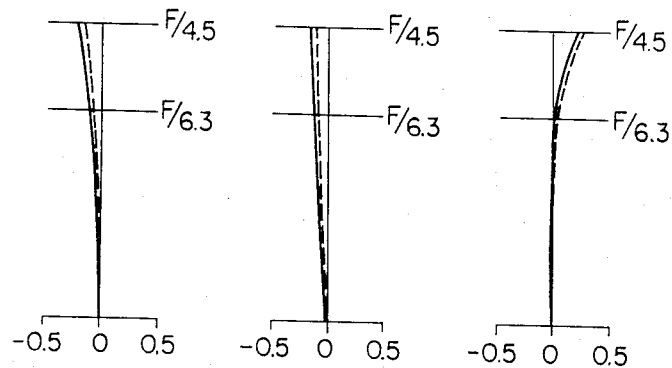
Figures 13A, 13B, 13C:
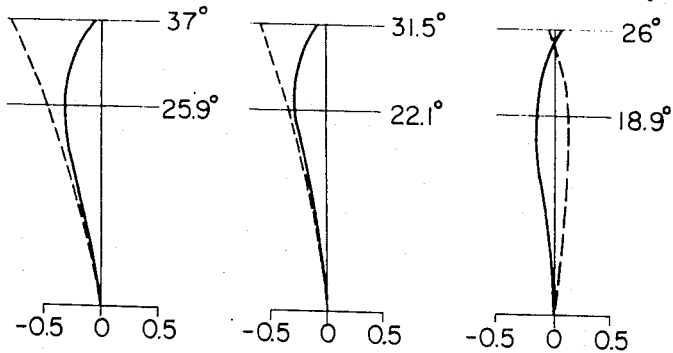
Figures 14A, 14B, 14C:
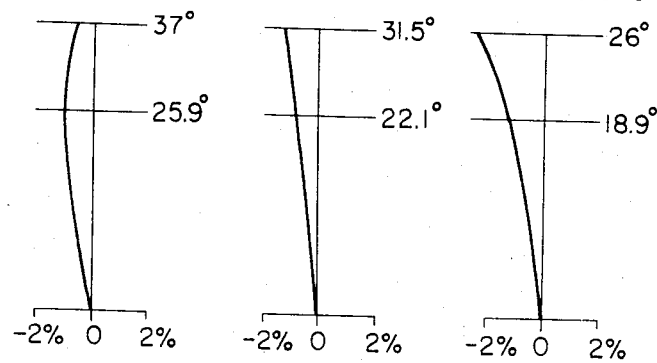

The spherical aberration and sine condition in this embodiment are shown in FIGS. 12(a), 12(b) and 12(c). The astigmatism and the distortional aberration are shown in FIGS. 13(a), 13(b), 13(c) and 14(a), 14(b) and 14(c), respectively. In these figures, (a), (b) and (c) show the aberrations at the minimum, medium and maximum focal points, respectively. It will be seen that very good correction of various aberrations have been again attained and especially the correction of the distortional aberrations is as good as in the lenses of fixed focal length.

I claim:

A zoom lens of the type in which a first lens group is divergent and all lens groups are movable, comprising a first lens group of divergence, a second lens group of convergence, a third lens group of divergence and a fourth lens group of convergence, said lens groups being disposed away from an object in the named order and having focal lengths of $f_1, f_2, f_3$ and $f_4$, respectively, said first to third lens groups having inter-principal-plane spacings $S_1$, $S_2$ and $S_3$ at their respective minimum focal length sides, said fourth lens group having a spacing $S_4$ between its principal plane and the image plane, wherein elements of the zoom lens are determined so as to satisfy the following conditions:

$$S_4 > f_4$$

$$S_3 + |f_3| < \frac{f_4 S_4}{S_4 - f_4}$$

$$|f_3| > S_3 > 0$$

$$f_4 - |f_3| - S_3 \geq 0$$

$$f_2 - S_2 < \frac{|f_3|\{f_4 S_4 - S_3(S_4 - f_4)\}}{f_4 S_4 - (S_3 + |f_3|)(S_4 - f_4)}$$

$$S_2 > 0$$

$$2|f_3| > f_2 > |f_3|$$

$$|f_1| + S_1 = f_2[S_2\{f_4 S_4 - (S_3 + |f_3|)(S_4 - f_4)\} + |f_3|\{f_4 S_4 - S_3(S_4 - f_4)\}]/$$
$$[(S_2 - f_2)\{f_4 S_4 - (S_3 + |f_3|) \times (S_4 - f_4)\} + |f_3|\{f_4 S_4 - S_3(S_4 - f_4)\}]$$

whereby the positions of the principal planes of said respective lens groups at their minimum focal length sides are determined in accordance with said determined inter-principal-plane spacings, said second, third and fourth lens groups being respectively displaced by amounts $\psi(x)$, $x$ and $\phi(x)$ from said positions thereof toward the object while satisfying the condition:

$$\psi(x) \geq x > \phi(x),$$

where $\psi(x)$ and $\phi(x)$ are functions increasing with any variation of $x$, said first lens group being displaced by an amount $y$ while satisfying the condition:

$$y = S_1 + |f_1| - \psi(x) - P,$$

where $$P = f_2[D_2\{f_4 D_4 - (D_3 + |f_3|)(D_4 - f_4)\} + |f_3|\{f_4 D_4 - D_3(D_4 - f_4)\}]/$$
$$[(D_2 - f_2)\{f_4 D_4 - (D_3 + |f_3|)(D_4 - f_4)\} + |f_3|\{f_4 D_4 - D_3(D_4 - f_4)\}]$$

$$D_2 = S_2 + \psi(x) - x$$
$$D_3 = S_3 + x - \phi(x)$$
$$D_4 = S_4 + \phi(x).$$

2. A zoom lens according to claim 1, wherein a stop is interposed between the third and fourth lens groups, the fourth lens group being a doublet comprising two concave and convex lenses cemented together, and the lens satisfies the following conditions:

| | | | | |
|---|---|---|---|---|
| $f_1 = -50.127$ | $r_1 = +74.514$ | $d_1 = 2.0$ | $n_1 = 1.54739$ | $\nu 1 = 53.6$ |
| | $r_2 = +35.58$ | $d_2 = 10.5$ | | |
| | $r_3 = -744.562$ | $d_3 = 4.25$ | $n_2 = 1.84110$ | $\nu 2 = 43.3$ |
| | $r_4 = -73.091$ | $d_4 = 1.3$ | $n_3 = 1.44628$ | $\nu 3 = 67.2$ |
| | $r_5 = +29.225$ | $d_5 = 30.8806 - 7.7366$ | | |
| $f_2 = 24.689$ | $r_6 = +37.907$ | $d_6 = 4.45$ | $n_4 = 1.6393$ | $\nu 4 = 45.0$ |
| | $r_7 = -28.141$ | $d_7 = 1.1$ | $n_5 = 1.744$ | $\nu 5 = 44.9$ |
| | $r_8 = -98.768$ | $d_8 = 0.1$ | | |
| | $r_9 = +19.309$ | $d_9 = 3.3$ | $n_6 = 1.57501$ | $\nu 6 = 41.3$ |
| | $r_{10} = +60.223$ | $d_{10} = 3.4106 - 3.7607$ | | |
| $f_3 = -18.637$ | $r_{11} = -118.839$ | $d_{11} = 3.7$ | $n_7 = 1.69895$ | $\nu 7 = 30.0$ |
| | $r_{12} = -21.666$ | $d_{12} = 1.0$ | $n_8 = 1.80518$ | $\nu 8 = 25.5$ |
| | $r_{13} = +19.163$ | $d_{13} = 2.1584 - 4.1897$ | | |
| $f_4 = 26.234$ | $r_{14} = +439.074$ | $d_{14} = 0.9$ | $n_9 = 1.72825$ | $\nu 9 = 28.3$ |
| | $r_{15} = +20.948$ | $d_{15} = 5.1$ | $n_{10} = 1.83330$ | $\nu 10 = 36.8$ |
| | $r_{16} = -25.982$ | | | |

Back focus (Bf) = 38.299 − 48.467;

wherein: $r$ represents the radius of curvature of each lens, $d$ represents the center thickness and air gap between lens surfaces, $n$ represents the refractive index of lens glass for $d$-ray, and $\nu$ represents the Abbe number of lens glass.

3. A zoom lens according to claim 1, wherein a stop is interposed between the second and third lens groups, the fourth lens group is a doublet comprising two concave and convex lenses cemented together, and an additional convex meniscus lens, and the lens satisfies the following conditions:

| | | | | |
|---|---|---|---|---|
| | $r_1=+47.014$ | $d_1=2.0$ | $n_1=1.57501$ | $\nu1=41.3$ |
| | $r_2=+28.131$ | $d_2=10.5$ | | |
| $f_1=-50.127$ | $r_3=-744.562$ | $d_3=4.2$ | $n_2=1.806$ | $\nu2=40.6$ |
| | $r_4=-73.091$ | $d_4=1.3$ | $n_3=1.44628$ | $\nu3=67.2$ |
| | $r_5=+29.967$ | $d_5=30.9389-7.7949$ | | |
| | $r_6=+37.907$ | $d_6=4.5$ | $n_4=1.60562$ | $\nu4=43.9$ |
| $f_2=24.689$ | $r_7=-30.741$ | $d_7=1.1$ | $n_5=1.744$ | $\nu5=44.9$ |
| | $r_8=-79.559$ | $d_8=0.1$ | | |
| | $r_9=+19.509$ | $d_9=3.0$ | $n_6=1.56883$ | $\nu6=56.0$ |
| | $r_{10}=+63.793$ | $d_{10}=4.7410-5.0912$ | | |
| | $r_{11}=-106.506$ | $d_{11}=1.7$ | $n_7=1.69895$ | $\nu7=30.0$ |
| $f_3=-18.637$ | $r_{12}=-19.666$ | $d_{12}=1.0$ | $n_8=1.79504$ | $\nu8=28.4$ |
| | $r_{13}=+19.095$ | $d_{13}=1.8433-3.8746$ | | |
| | $r_{14}=+1439.074$ | $d_{14}=0.9$ | $n_9=1.72825$ | $\nu9=28.3$ |
| | $r_{15}=+20.015$ | $d_{15}=2.6$ | $n_{10}=1.8333$ | $\nu10=36.8$ |
| $f_4=26.234$ | $r_{16}=-51.269$ | $d_{16}=1.0$ | | |
| | $r_{17}=-55.0$ | $d_{17}=2.3$ | $n_{11}=1.76684$ | $\nu11=46.6$ |
| | $r_{18}=-24.699$ | | | |

Back focus (Bf) = 37.728 − 47.897; wherein $r$ represents the radius of curvature of each lens, $d$ represents the center thickness and air gap between lens surfaces, n represents the refractive index of lens glass for $d$-ray and $\nu$ represents the Abbe number of lens glass.

4. A zoom lens according to claim 1, which satisfies the following conditions:

| | | | | |
|---|---|---|---|---|
| | $r_1=+52.201$ | $d_1=2.0$ | $n_1=1.52$ | $\nu1=70.1$ |
| | $r_2=+28.743$ | $d_2=11.5$ | | |
| $f_1=-50.127$ | $r_3=-744.562$ | $d_3=4.2$ | $n_2=1.80411$ | $\nu2=46.4$ |
| | $r_4=-70.591$ | $d_4=1.3$ | $n_3=1.44628$ | $\nu3=67.2$ |
| | $r_5=+29.871$ | $d_5=30.3905-5.8365$ | | |
| | $r_6=+39.507$ | $d_6=4.5$ | $n_4=1.61117$ | $\nu4=55.8$ |
| | $r_7=-32.141$ | $d_7=1.1$ | $n_5=1.8411$ | $\nu5=43.3$ |
| $f_2=24.689$ | $r_8=-65.335$ | $d_8=0.1$ | | |
| | $r_9=+18.809$ | $d_9=3.0$ | $n_6=1.54072$ | $\nu6=47.2$ |
| | $r_{10}=+60.333$ | $d_{10}=4.8$ | | |
| | $r_{11}=-117.506$ | $d_{11}=1.7$ | $n_7=1.69680$ | $\nu7=55.6$ |
| $f_3=-18.637$ | $r_{12}=-19.070$ | $d_{12}=1.0$ | $n_8=1.80454$ | $\nu8=39.5$ |
| | $r_{13}=+19.373$ | $d_{13}=1.0864-4.1597$ | | |
| | $r_{14}=+889.704$ | $d_{14}=0.7$ | $n_9=1.72825$ | $\nu9=28.3$ |
| | $r_{15}=+22.348$ | $d_{15}=2.4$ | $n_{10}=1.84110$ | $\nu10=43.3$ |
| $f_4=26.234$ | $r_{16}=-53.729$ | $d_{16}=0.5$ | | |
| | $r_{17}=-55.0$ | $d_{17}=4.8$ | $n_{11}=1.76684$ | $\nu11=46.6$ |
| | $r_{18}=-24.222$ | | | |

Back focus (Bf) = 37.768 − 48.895; wherein $r$ represents the radius of curvature of each lens, $d$ represents the center thickness and air gap between lens surfaces, $n$ represents the refractive index of lens for $d$-ray and $\nu$ represents the Abbe number of lens glass.

5. A variable focal length objective lens system consisting in seriation of a first lens group of divergence, a second lens group of convergence, a third lens group of divergence and a fourth lens group of convergence, all of said groups being movable for zooming, said second, third and fourth lens groups being displaceable toward an object, satisfying the following condition:

$$\psi(x) \geqq x > \phi(x)$$

where $\psi(x)$, $x$ and $\phi(x)$ represent the amounts of displacement of the second, third and fourth lens groups, respectively, and $\psi(x)$ and $\phi(x)$ are functions which increase with any variation of x; and further the first lens groups is displaceable toward an image, while satisfying the following condition:

$$y = S_1 + |f_1| - \psi(x) - P$$

where y represents the amount of displacement of the first lens groups;

$$P = \frac{f_2[D_2\{f_4D_4-(D_3+|f_3|)(D_4-f_4)\} + |f_3|\{f_4D_4-D_3(D_4-f_4)\}]}{[(D_2-f_2)\{f_4D_4-(D_3+|f_3|)(D_4-f_4)\} + |f_3|\{f_4D_4-D_3(D_4-f_4)\}]}$$

$D_2 = S_2 + \psi(x) - x$
$D_3 = S_3 + x - \phi(x)$
$D_4 = S_4 + \phi(x)$
$f_1$ to $f_4$ represent focal lengths of the first to fourth lens groups, respectively;

$S_1$ to $S_3$ represent inter-principal-plane spacings between the first and second lens groups, between the second and third lens groups, and between the third and fourth lens groups, respectively; and $S_4$ represents the spacing between the principal plane of the fourth lens group and the image plane.

6. A variable focal length objective lens system according to claim 5, wherein the first lens group includes a negative meniscus single lens element convex toward the object and a biconcave doublet of which the cemented surface is concave toward the object, the second lens group including a biconvex doublet of which the cemented surface is concave toward the object and a positive meniscus single lens element convex toward the object, the third lens group including a biconcave doublet of which the cemented surface is concave toward the object, and the fourth lens group including at least a biconvex doublet of which the cemented surface is convex toward the object.

7. A variable focal length objective lens system according to claim 6, wherein the second, third and fourth lens groups move by different displacement amount respectively to each other.

8. A variable focal length objective lens system according to claim 6, the third lens group moves in unison with the second lens group.

9. A variable focal length objective lens system according to claim 6, wherein the fourth lens group further includes a positive meniscus concave toward the object.

* * * * *

UNITED STATES PATENT OFFICE
CERTIFICATE OF CORRECTION

Patent No. 3,771,853      Dated  November 13, 1973

Inventor(s) SOICHI NAKAMURA

It is certified that error appears in the above-identified patent and that said Letters Patent are hereby corrected as shown below:

Column 3, line 47, change "allower" to -- allover --.
Column 8, in the Table, change "$r_{14}=+\ 889.704$" to
  -- $r_{14}=+\ 889.074$ --.
Column 13, line 1, before "$S_1$ to $S_3$", insert -- for a minimum focal distance of the system --;
Column 13, line 5, before "$S_4$", insert -- for said minimum focal distance --.

Signed and sealed this 17th day of September 1974.

(SEAL)
Attest:

McCOY M. GIBSON, JR.                C. MARSHALL DANN
Attesting Officer                   Commissioner of Patents